Sept. 21, 1948.  C. E. G. BAILEY  2,449,577
ELECTRICAL CONDENSER
Filed Oct. 9, 1942 2 Sheets-Sheet 1
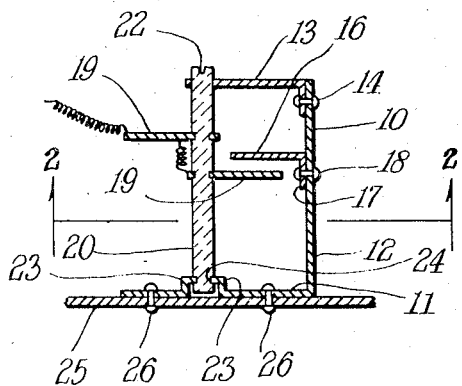
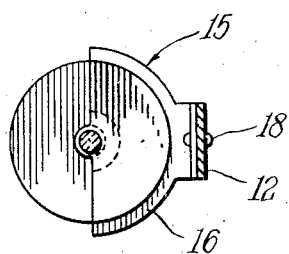
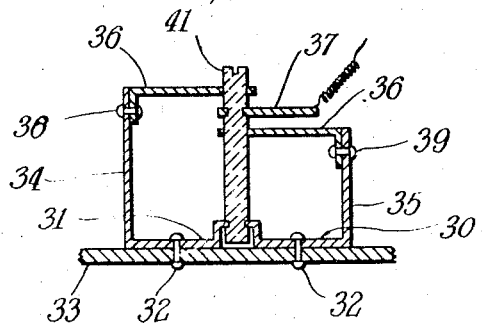
CHRISTOPHER E. G. BAILEY
INVENTOR.
BY
ATTORNEY Sept. 21, 1948.  C. E. G. BAILEY  2,449,577
ELECTRICAL CONDENSER
Filed Oct. 9, 1942  2 Sheets-Sheet 2
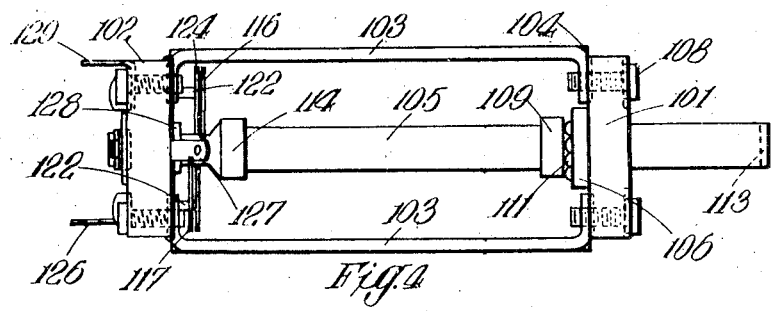
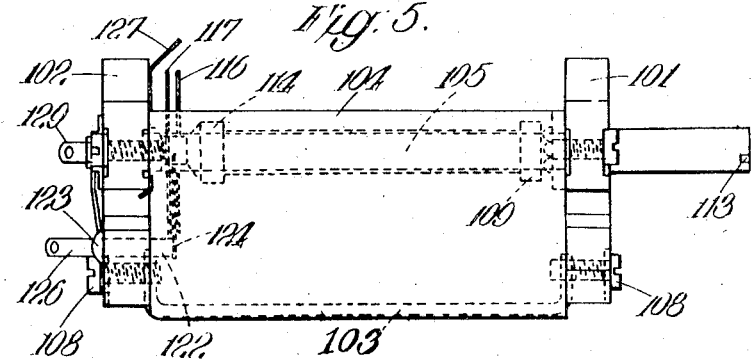
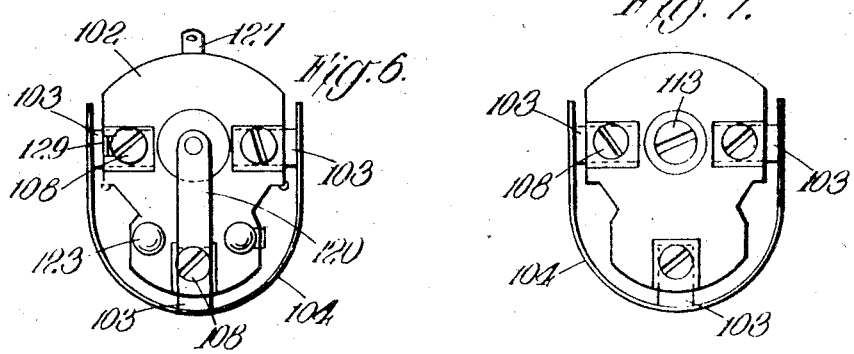
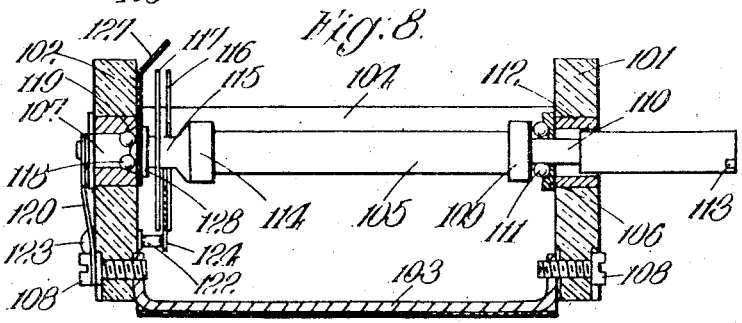
CHRISTOPHER E. G. BAILEY
INVENTOR
BY
ATTORNEY Patented Sept. 21, 1948

2,449,577

UNITED STATES PATENT OFFICE 2,449,577

ELECTRICAL CONDENSER

Christopher E. G. Bailey, Bournemouth, England, assignor to Hartford National Bank and Trust Company, Hartford, Conn., as trustee Application October 9, 1942, Serial No. 461,469
In Great Britain October 10, 1941

6 Claims. (Cl. 175—41.5)

The present invention relates to electrical condensers and more particularly to condensers which exhibit a temperature coefficient of capacity value. The chief use of such condensers is to compensate for the changes which normally occur in the electrical constants or electrical oscillatory circuits due to temperature changes of the components thereof and for this reason the condensers are commonly referred to as compensating condensers.

It is an object of the invention to provide a compensating condenser having a variable temperature coefficient of capacity value.

A further object of the invention is to provide a compensating condenser which is simple to manufacture and of low cost.

These and further objects of the invention will appear as the specification progresses.

The invention will be further described with reference to the appended drawing forming part of the specification and in which Figure 1 is a front elevation in cross-section showing a compensating condenser in accordance with the invention.

Fig. 2 is a cross-sectional view of Fig. 1 taken along the line 2—2.

Fig. 3 is a front elevation in cross-section showing a compensating condenser in accordance with another embodiment of the invention.

Figs. 4 to 8 show details of another embodiment, of which:

Fig. 4 is a plan view,

Fig. 5 is a side elevation,

Fig. 6 is an elevation of one end,

Fig. 7 is an elevation of the other end,

Fig. 8 is a substantially central longitudinal section.

Referring to the drawing; the condenser shown in Figs. 1 and 2 comprises a substantially C-shaped metal bracket 10 within which the electrode elements of the condenser are contained. Bracket 10 comprises a base portion 11, a supporting portion 12 integral with the base 11 and an arm 13 secured to the support 12, for example, by a rivet 14.

As one electrode of the condenser there is provided a metal plate or vane 15 having a substantially semi-circular electrode portion 16 and an integral arm 17 extending at right angle to the portion 16 and by which the electrode is fixedly secured to the support 12 by a rivet 18.

Positioned on an insulating shaft 20 and on opposite sides of the electrode 16 are substantially parallel semi-circular metal vanes 19—19 forming the second electrode of the condenser.

Suitable materials for the base-support 11—12, the arm 13, and vanes 15 and 19—19 may be for example, brass Phosphor bronze or the like, whereas the shaft 20 consists of a material having a temperature coefficient of linear expansion substantially different from that of support 12. For example, when using a support 12 of brass, the shaft 20 may consist of porcelain.

As shown, the vanes 19—19 are arranged on diametrically opposite sides of the shaft 20 whereby each vane 19 may be alternately brought in capacitative relationship with the fixed vane 16 by rotation the shaft 20 as by means of a screw driver engaging a slot 22 formed at one end of the shaft.

For positioning the shaft 20 within the condenser assembly one end thereof is provided with an annular recess 24 which engages offset yoke portions 23—23 of the base 11 said portions 23—23 serving as a thrust bearing for the shaft and preventing axial movement thereof relative to the base. At its other end the shaft is journalled through the arm 13 which serves as a displaceable bearing for the shaft and permits unrestricted axial movement of the shaft relative to the arm.

The condenser is secured to the apparatus of which it forms a part, for example, to a chassis 25 of a radio receiver, by rivets 26—26 passing through the base 11 and the chassis 25.

The operation of the constant-capacity variable temperature coefficient of capacity condenser of the invention is as follows:

Since the vanes 19—19 are arranged on diametrically opposite sides of the shaft 20, the capacity of the condenser remains substantially constant irrespective of the rotary position of the shaft 20 and correspondingly, irrespective of which the vanes 19 is adjacent to the vane 16. However, due to the differential temperature expansion of the shaft 20 and the support 12 a change in the temperature of the condenser produces a movement of the electrode vane 15 relative to the vanes 19—19 in a direction normal to the planes of the vanes. This movement brings about either an increase or a decrease in the capacity of the condenser depending on the direction of the temperature change and depending on which of the vanes 19 is positioned adjacent to the vane 16. For example, when the condenser electrodes are positioned as shown in Fig. 1 and the support 12 consists of a material having a greater temperature coefficient of linear expansion than the material of the shaft 20, an increase in temperature will cause the vane 16 to move away from the lower vane 19 thereby decreasing the capacity of the condenser. By reversing the position of the vanes 19—19 as by rotating the shaft 20 through 180° an increase in temperature decreases the spacing between the cooperating electrodes and brings about an increase in the capacity of the condenser.

The temperature coefficient of the capacity of the condenser can be given any value between the positive and negative coefficient limits of the condenser by varying the degree of engagement of one or the other of the vanes 19 with the vane 16.

As will appear the limits of capacity coefficient are determined by the area of the electrodes vanes, and the spacing between the vanes, the differences in the temperature coefficients of linear expansion of the support 12 and the shaft 20 and by the length of these members. In general the greater the area of the vanes, the greater the difference in the temperature coefficient of expansion of the materials of shaft 20 and support 12, the greater the difference in the temperature coefficient of expansion of the materials of shaft 20 and support 12, the greater the length of these members, and the smaller the spacing between each electrode 19 and electrode 16 the greater will be the limits of the value of capacity coefficient.

The condenser shown in Fig. 3 comprises a substantially U-shaped metal bracket 30 having a yoke portion 31 by which the condenser may be mounted, for example, on the chassis 33 of a radio receiver, by means of rivets 32—32, and arm portions 34—35 serving as supports for two fixed electrode vanes 36—36 respectively. Electrode vanes 36—36 are secured to their respective supports by means of rivets 38—39 and are positioned in relatively parallel spaced planes.

The second electrode of the condenser consists of a metal vane 37 secured to a rotatable shaft 41 and spacedly interposed between the vanes 36—36.

One end of the shaft 41 is fixedly bearinged in the yoke 31 in the manner previously described in connection with the condenser of Figs. 1 and 2. The other end of the shaft 41 is journalled in displaceable bearings formed by the fixed vanes 36—36 through which the shaft passes.

The materials constituting the supports 34—35 and the shaft 41 conform to the requirements previously set forth and a further description of the same is believed to be unnecessary. The manner in which the condenser is made to exhibit either a positive or a negative temperature coefficient of capacity by rotation of the shaft 41 is also similar to that of the condenser of Figs. 1 and 2.

Two end plates 101, 102, made of porcelain for instance, are rigidly united by a metal structure consisting of bars 103 and a trough-like metal screen 104 to which the bars 103 are welded or otherwise secured. The metal structure 103, 104, which is suitably made of brass or other metal of comparable coefficient of expansion is attached to the end plates 101, 102 by screws 108. A shaft 105 is rotatably supported in the end plates 101, 102, being carried by a fixed thrust bearing 106, in the plate 101 and an axially movable bearing 107 in the plate 102. The shaft 105 consists essentially of porcelain or other material of different coefficient of expansion from the structure 103, 104. At the end adjacent the end plate 101 the porcelain shaft 105 is mounted in a metal collar 109 carrying a stem 110 of reduced diameter which passes between the ball bearings 111 supported against the thrust plate of the bearing 106. Beyond the balls 111 the stem 110 has an increased diameter and is slidable in a bushing 112 in the end plate 101. The outer end of the stem 110 is slotted at 113 to receive a screwdriver or similar tool to facilitate rotation of the shaft 105. The end of the porcelain shaft 105 adjacent the end plate 102 carries a metal collar 114 with a stem 115 on which two substantially semi-circular vanes 116, 117 are secured so as to lie on opposite sides of the shaft 105 in parallel planes at right angles to the axis of rotation of the shaft 105. The end of the stem 115 abuts against bearing balls 118 of the axially movable bearing 107, the cylindrical block of the latter being axially slidable in a bushing 119 in the end plate 102. A blade spring 120 anchored to the end plate 102 by one of the screws 108 constantly urges the cylindrical block of the bearing 107 inwardly and thereby maintains the shaft 105 seating against the fixed thrust bearing 106.

Mounted on two arms 122 secured to the end plate 102 by rivets 123 is fixed substantially semi-circular vane 124 which lies in a plane intermediate and parallel to the planes of the moving vanes 116, 117. The vanes are of the same radius and are mounted so as to be concentric with the shaft 105. The dimensions of the components of the condenser are so chosen that at a selected temperature the plane of the vane 24 is exactly halfway between the planes of the vanes 116, 117. Then, at this temperature, the capacity of the condenser is independent of the relative angular setting of the shaft 105 with reference to the fixed vane 124. However, variations in temperature will cause the fixed vane 124 to approach one and to recede from the other of the movable vanes 116, 117. The resulting capacity variation will vary between a positive and a negative maximum in accordance with the angular setting of the shaft 105, and thus the temperature coefficient of the condenser can be varied arbitrarily between predetermined positive and negative limits.

A terminal tag 126 is connected to the fixed vane 124 by soldering to one of the rivets 123, while a terminal tag 127 is connected to the movable vanes 116, 117, by frictional engagement with a shoulder 128 integral with the metal stem 115 carrying these vanes. A terminal tag 129 is clamped by one of the screws 108 engaging the structure 103, 104, and is thereby electrically connected thereto. The structure 103, 104, can, if desired, be employed as an electrostatic screen.

It will be apparent that the condenser as illustrated can conveniently be mounted behind a panel by anchoring means engaging the end plate 101, an opening being provided in the panel for the passage of the stem 110. On the face of the panel, a scale and pointer can be provided to indicate the setting of the vanes 116, 117 in relation to the vane 124.

Instead of the disposition of the vanes as described and illustrated the two vanes may be stationarily carried by the framework consisting of the end plates and connecting structure, and the single vane may be carried by the shaft.

If it is desired to augment the pressure at the thrust bearing 106 a spring washer may be interposed between the end plate 102 and the shoulder 128.

While I have described my invention by means of specific examples and in specific embodiments, I do not wish to be limited thereto, for obvious modifications will occur to those skilled in the art

I claim:

1. A temperature-responsive electrical condenser unit comprising a first electrode consisting of two substantially parallel metal vanes spacedly positioned in staggered relationship with respect to each other in parallel noncoincident planes, a second electrode consisting of a metal vane spacedly interposed between the first vanes in a plane parallel to the planes of said first vanes, a rotatable shaft member having one of said electrodes secured thereto to alternately position one of said first vanes and said second electrode adjacent one another, and temperature-responsive means for moving one of said electrodes relative to the other in a direction perpendicular to the planes of the vanes.

2. A temperature-responsive electrical condenser unit comprising a base, a rotatable shaft member having one end axially fixed by said base, a first electrode consisting of two substantially parrallel metal vanes secured to said shaft in spaced relationship and positioned on diametrically opposite sides of the shaft in parallel noncoincident planes, a second electrode consisting of a metal vane positioned between said first vanes in a plane between and parallel to the planes of said first vanes, and a support interposed between the vane of said second electrode and said base, said rotatable shaft consisting of a material having a coefficient of linear expansion different from that of the material of said support.

3. A temperature-responsive electrical condenser unit comprising a base, a rotatable shaft member having one end axially fixed by said base, a first electrode consisting of a metal vane secured to said shaft and extending radially therefrom, a second electrode consisting of two spaced metal vanes each lying in a separate plane parallel to the plane of said first vane and being positioned in staggered relationship on diametrically opposite sides of the shaft one above and one below the plane of said vane, supports securing the vanes of said second electrode to the base, said supports consisting of a material having a temperature coefficient of linear expansion different from that of the material of said shaft.

4. A temperature-responsive electrical condenser unit comprising a base, a rotatable porcelain shaft fixedly bearinged at one end on said base, a first electrode consisting of two substantially parallel metal vanes secured to said shaft in spaced relationship in parallel noncoincident planes and having the major portion of their surfaces positioned on diametrically opposite sides of the shaft, a supporting member secured to said base, a displaceable bearing journalled about the other end of the shaft and secured to said supporting member, a second electrode consisting of a metal vane secured to said supporting member and positioned between said first vanes in a plane between and parallel to the planes thereof, said supporting member consisting of a material having a coefficient of linear expansion different from that of the material of said shaft.

5. A temperature-responsive electrical condenser unit comprising a rotatable shaft mounted at one end in a thrust bearing and supported at the other end by a bearing permitting axial movement and carried by a rigid framework attached to the thrust bearing, a first electrode consisting of a pair of electrically connected vanes mounted in spaced parallel planes at right angles to the shaft on opposite sides thereof, a second electrode consisting of a fixed vane carried by the rigid framework in a plane parallel to and intermediate the planes of the pair of vanes, the coefficients of thermal expansion of the shaft and the framework being different so that the fixed vane, which is in a plane midway between the other two vanes at a selected temperature, moves in the axial direction of the shaft with reference to the other vanes on change of temperature.

6. A temperature-responsive electrical condenser unit as claimed in claim 5 in which a metallic screening plate embraces the condenser electrodes and forms part of the supporting structure therefor.

CHRISTOPHER E. G. BAILEY.

REFERENCES CITED

The following references are of record in the file of this patent:

UNITED STATES PATENTS

| Number | Name | Date |
| --- | --- | --- |
| 1,616,622 | Horton | Feb. 8, 1927 |
| 1,749,967 | Benjamin | Mar. 11, 1930 |
| 1,848,872 | Cramer | Mar. 8, 1932 |
| 1,913,978 | Ewen | June 13, 1933 |
| 2,156,056 | Horning | Apr. 25, 1939 |
| 2,361,657 | Schock | Oct. 31, 1944 |

FOREIGN PATENTS

| Number | Country | Date |
| --- | --- | --- |
| 111,790 | Australia | Apr. 17, 1939 |